(12) United States Patent
Hautvast et al.

(10) Patent No.: US 9,684,955 B2
(45) Date of Patent: Jun. 20, 2017

(54) CARDIAC CONTOUR PROPAGATION

(75) Inventors: Guillaume Leopold Theodorus Frederik Hautvast, Eindhoven (NL); Marcel Breeuwer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2237 days.

(21) Appl. No.: 12/598,534

(22) PCT Filed: Apr. 24, 2008

(86) PCT No.: PCT/IB2008/051582
§ 371 (c)(1),
(2), (4) Date: Nov. 2, 2009

(87) PCT Pub. No.: WO2008/135882
PCT Pub. Date: Nov. 13, 2008

(65) Prior Publication Data
US 2010/0135551 A1   Jun. 3, 2010

(30) Foreign Application Priority Data

May 4, 2007 (EP) .................... 07107500
Nov. 19, 2007 (EP) .................... 07120993

(51) Int. Cl.
*G06K 9/00* (2006.01)
*G06T 7/00* (2017.01)
*G06T 7/11* (2017.01)
*G06T 7/149* (2017.01)

(52) U.S. Cl.
CPC .............. *G06T 7/0012* (2013.01); *G06T 7/11* (2017.01); *G06T 7/149* (2017.01); *G06T 2207/10072* (2013.01); *G06T 2207/10132* (2013.01); *G06T 2207/30048* (2013.01); *G06T 2207/30196* (2013.01)

(58) Field of Classification Search
CPC .... G06K 9/6207; G06T 7/0083; G06T 7/0089
USPC ........................................................ 382/128
See application file for complete search history.

(56) References Cited

U.S. PATENT DOCUMENTS

| | | |
|---|---|---|
| 5,239,591 A | 8/1993 | Ranganath |
| 5,633,951 A | 5/1997 | Moshfeghi |
| 6,980,682 B1 | 12/2005 | Avinash et al. |

(Continued)

OTHER PUBLICATIONS

Chalana, V., et al.; A Methodology for Evaluation of boundary Detection Algorithms on Medical Images; 1997; IEEE Trans. on Medical Imaging; 16(5)642-652.

(Continued)

*Primary Examiner* — Reginald R Reyes

(57) ABSTRACT

The invention relates to a method for analyzing a multidimensional cardiac image set, the multidimensional cardiac image set comprising: a first image set of a heart; and a second image set of a heart, wherein the first image set is segmented resulting into respective first cardiac contours for each image within the first image set; and the second image set is segmented resulting into respective second cardiac contours for each image within the second image set, the method comprising: determining resulting cardiac contours for each image within the first image set and for each image within the second image set from the first cardiac contours and the second cardiac contours.

19 Claims, 2 Drawing Sheets

(56) References Cited

U.S. PATENT DOCUMENTS

| | | | |
|---|---|---|---|
| 7,079,674 B2 | 7/2006 | Paragios et al. | |
| 7,327,862 B2* | 2/2008 | Murphy | G09B 23/28 |
| | | | 128/922 |
| 2002/0118866 A1* | 8/2002 | Breeuwer | G06T 7/0038 |
| | | | 382/128 |
| 2002/0177775 A1* | 11/2002 | Torp | A61B 8/485 |
| | | | 600/443 |
| 2003/0053667 A1* | 3/2003 | Paragios | G06T 7/215 |
| | | | 382/128 |
| 2006/0058618 A1* | 3/2006 | Nishiura | G06T 7/20 |
| | | | 600/407 |
| 2007/0260108 A1* | 11/2007 | Criscione | A61M 1/1068 |
| | | | 600/16 |
| 2010/0027861 A1* | 2/2010 | Shekhar | G06K 9/6207 |
| | | | 382/131 |

OTHER PUBLICATIONS

Frangi, A.F., et al.; Three-dimensional Modeling for Functional analysis of Cardiac Images: A Review; 2001; IEEE Trans. on Medical Imaging; 20(1)2-25.

Hajnal, J. V.; Medical Image Registration, Preparation and display of Image Data; 2001; Medical Image Registration; pp. 71-86.

Hautvast, G.L.T.F., et al.; Automatic cardiac contour propagation in short axis cardiac MR images; 2005; International Congress Series; 1281:351-356.

Hautvast, G., et al.; Automatic contour propagation in cine cardiac magnetic resonance images; 2006; IEEE Trans. on Medical Imaging; 25(11)1472-1482.

Ho, C., et al.; STACS: New Active Contour Scheme for Cardiac MR Image Segmentation; 2005; IEEE Trans. on Medical Imaging; 24(5)593-603.

* cited by examiner

CARDIAC CONTOUR PROPAGATION

FIELD OF THE INVENTION

The invention relates to a method for analyzing a multidimensional cardiac image set.

The invention relates further to a computer server comprising a processor for processing such a method.

The invention relates further to a computer client comprising input means for enabling a user to invoke such a method; receiving means for receiving a result of invoking such a method; a display for displaying the result; and a processor for processing the invocation, the received result and the displaying.

The invention relates further to a system analyzing a multidimensional cardiac image set.

The invention relates further to a medical imaging workstation comprising such a system.

The invention relates further to a computer program product to be loaded by a computer arrangement, comprising instructions for analyzing a multidimensional cardiac image set, the computer arrangement comprising processing unit and a memory.

Functional cardiac imaging can be performed using various modalities, such as magnetic resonance (MR), computed tomography (CT), and ultrasound (US). Functional cardiac images consist of multiple phases and multiple slices. Additionally, functional cardiac imaging is often performed in so-called stress examinations, in which functional images are acquired at rest and at several levels of cardiac stress. Hence, such stress exams result in 5 Dimensional (5D) data sets that have to be segmented to allow quantitative analysis.

BACKGROUND OF THE INVENTION

U.S. Pat. No. 7,079,674 B2 discloses a system and method for segmenting cardiac images using a contour propagation model that integrates visual information and anatomical constraints. The propagation model comprises a weighted integration of a boundary segmentation model, a region model and a coupling function.

U.S. Pat. No. 5,239,591 discloses a method of extracting contours in multi-phase multi-slice cardiac magnetic resonance imaging study in response to user input of a seed contour identifying the contour feature to be extracted in an initial image at a middle slice position and a predetermined phase position, namely end of diastole. From this as the only contour inputted by the user, contours are extracted from each image by a sequence of automatic propagation of determinations of extracted or final contours by forming from a final contour for an image a seed contour for a not yet processed image which immediately adjoins in slice or phase position.

Another semi-automatic cardiac contour propagation method is described in G. L. T. F. Hautvast et al., "Automatic cardiac contour propagation in short axis cardiac MR images", In proc. CARS 2005, Elsevier ICS 1281:351-356, 2005. Here, an automatic cardiac contour propagation method is described based on active contours. The method can be used to propagate cardiac contours that conform to an initial manual segmentation by exploiting information in adjacent images. It is used to delineate the left ventricle endocardium, the left ventricle epicardium and right ventricle endocardium contours.

Further, in G. L. T. F. Hautvast, S. Lobregt, M. Breeuwer and F. A. Gerritsen, "Automatic Contour Propagation in Cine Cardiac Magnetic Resonance Images", IEEE TMI 25(11): In press, 2006. Here, a method for automatic contour propagation in cine cardiac magnetic resonance images is described. The method consists of an active contour model that tries to maintain a constant contour environment by matching gray values in profiles perpendicular to the contour. Consequently, the contours maintain a constant position with respect to neighboring anatomical structures, such that the resulting contours reflect the preferences of the user. This is particularly important in cine cardiac magnetic resonance images because local image features do not describe the desired contours near the papillary muscle. The accuracy of the propagation result is influenced by several parameters. Because the optimal setting of these parameters is application dependent, it is described how to use full factorial experiments to optimize the parameter setting. Such semi-automatic segmentation tools are capable of propagating cardiac contours manually defined in a functional image at the end diastolic (ED) phase to the other phases in the heart cycle.

SUMMARY OF THE INVENTION

It is an object of the invention to provide a method according to the opening paragraph that enables propagation of cardiac contours in functional images in a more efficient way. In order to achieve this object, the multidimensional cardiac image set comprises: a first image set of a heart; and a second image set of a heart, wherein the first image set is segmented resulting into respective first cardiac contours for each image within the first image set and the second image set is segmented resulting into respective second cardiac contours for each image within the second image set, the method comprises: determining resulting cardiac contours for each image within the first image set and for each image within the second image set from the first cardiac contours and the second cardiac contours.

The invention is based upon the insight that the cardiac contours that are determined automatically or manually for each image set can be used to automatically determine a resulting cardiac contour. Especially when there is a relation between the image sets, which is the case when each image set relates to a different level of cardiac stress, using the cardiac contours of each image set to derive the resulting cardiac contours results in more accurate cardiac contours for each image set.

In an embodiment of the method according to the invention, the first image set of a heart and the second image set of a heart relate to different levels of cardiac stress. In cardiac ischemia, which is the most frequently occurring heart disease, the blood flow to the heart muscle, the myocardium, is obstructed by a partial occlusion of the coronary arteries. In early stages, this disease causes stress induced ventricular dysfunction and wall motion abnormalities, which can be assessed using functional cardiac imaging in a stress exam. A quantitative assessment of stress induced ventricular dysfunction and wall motion abnormalities is possible by analyzing the images acquired in stress examination using cardiac analysis.

By taking due account of the functional images from the individual stress levels, the close relation between the images is used. Imperfections in the (semi-) automatically computed segmentation at the functional image at rest are likely to re-occur at the other stress levels. Corrections at one stress level are propagated to the others, such that similar imperfections need to be corrected only once. As a consequence, the entire analysis can be performed more efficiently, with a significant reduction of the total segmentation time, since the method avoids the very time consuming individual segmentation or correction of segmentation of all stress levels.

In an embodiment of the method according to the invention, the first image set is further segmented resulting into further respective first cardiac contours; and the second image set is further segmented resulting into further respective second cardiac contours, and the method comprises: determining the resulting cardiac contours for each image within the first image set and for each image within the second image set from the first cardiac contours, the second cardiac contours, the further first cardiac contours and the further second cardiac contours. By using different segmentations for the image sets, the resulting cardiac contours are based upon cardiac contours that are segmented in multiple ways and become even more accurate. The further segmentation of the first and second image set may include corrections made by a user to the segmentations resulting into respective first and second image cardiac contours. However, the further segmentations may also relate to segmentations confirmed by a user, i.e. without making corrections. Thus, the further segmentation of an image set may comprise confirmations of segmentations (i.e. no corrections), or corrections in only one or in more than one image within the image set. Both in the case of confirmations and in the case of corrections, the user input ensures that the further segmentations may be given a high degree of trust.

In another embodiment of the method according to the invention, the further respective first cardiac contour and/or the further respective second cardiac contour is/are specified manually. The manual specification of the further respective first cardiac contour and/or the further respective second cardiac contour allows for user interaction, e.g. to perform corrections of the automatic specification. Hereby, an edit in one image in the first or second image set at one level of cardiac stress may influence images at other levels of cardiac stress. Thus, corrections supplied at one or more images in an image set obtained at one specified stress level (e.g. at rest) may be propagated to images at other image sets of the heart obtained at different stress levels. This provides for a better segmentation for the other images (than the one corrected), in that it may become obsolete to perform corrections at more than one stress level. Moreover, a reduction in total time for analyzing the image sets may be obtained.

In a further embodiment of the method according to the invention, the method comprising determining the resulting cardiac contours by using fixed weights for the first, second, further first, and further second cardiac contours. The fixed weights are an easy way to determine the contribution of the individual cardiac contours to the resulting cardiac contours.

In a further embodiment of the method according to the invention, the method comprises determining the resulting cardiac contours by using variable weights depending upon a position of an image within the first and second image set for the first, second, further first, and further second cardiac contours. The position of an image within an image set determines the moment in the heart cycle that the cardiac image was acquired. In this way, images that are comprised in different data sets can be related to each other as belonging to the same moment in the heart cycle. As a consequence, the resulting cardiac contour becomes more accurate.

In a further embodiment of the method according to the invention, the method comprising determining the resulting cardiac contours by using predefined weights for the first, second, further first, and further second cardiac contours. Such predefined weights can for example be stored in a lookup table which is fast to access and consequently, the calculation time for determining the resulting cardiac contour is decreased. Moreover, greater weight may be given to the further contours, especially if the further contours are specified manually, in that such manually specified further contours may be trusted to give a better result of the segmented contours. Again, the further contours may relate to user made corrections or confirmations of the segmentations of an image set into first cardiac contours.

In a further embodiment of the method according to the invention, the method comprises determining the resulting cardiac contours by using adaptive weights depending upon the heart for the first, second, further first, and further second cardiac contours. Such adaptive weights can be patient dependent. For example, for patients of considerable weight, the difference between the images of the different stress levels is larger than for patients of a lower weight. As a consequence, the detected cardiac contours for related images for different stress levels may differ more and a resulting cardiac contour must take this into account.

In a further embodiment of the method according to the invention, the method comprising determining the resulting cardiac contours by using a distance between a first image within the first image set and a second image within the second image set. This distance can be expressed by the phase of the heart cycle that the image shows. The further apart the images are within the phase within the different image sets, the longer the distance becomes. Using this information is for the benefit of the resulting cardiac contour.

In a further embodiment of the method according to the invention, the method comprising determining the resulting cardiac contours by using temporal information from the segmentation and the further segmentation. Advantageously, the temporal information relates to the relative lengths of characteristic periods of the heart cycle, which changes at higher stress levels. This results in misalignment of the images over the different image sets. By taking this into account for determining the resulting cardiac contour, the result becomes more accurate.

It is a further object of the current invention to provide a computer server, a computer client, a system, a medical imaging workstation, and a computer program product according to the opening paragraphs that enable propagation of cardiac contours in functional images in a more efficient way. In order to achieve this object:

the computer server comprises a processor for processing the method according to the invention;

the computer client comprises: input means for enabling a user to invoke the method according to the invention; receiving means for receiving resulting cardiac contours of invoking the method according to the invention; display for displaying the resulting cardiac contours within the first and second image set and a processor for processing the invocation, the received result and the displaying;

the system comprises: the multidimensional cardiac image set comprising: a first image set of a heart and a second image set of a heart, wherein the first image set is segmented resulting into respective first cardiac contours for each image within the first image set; and the second image set is segmented resulting into respective second cardiac contours for each image within the second image set, the system comprising: determining means for determining resulting cardiac contours for each image within the first image set and for each image within the second image set from the first cardiac contours and the second cardiac contours the medical imaging workstation comprising a system according to the invention; and the computer program product to be loaded by a computer arrangement, comprising instructions for analyzing a multidimensional cardiac image set, the multidimensional cardiac image set comprising a first image set of a heart; and a second image set of a heart, wherein the first image set is segmented resulting into respective first cardiac contours for each image within the first image set and the second image set is segmented resulting into respective second cardiac contours for each image within the second image set, the computer arrangement comprising processing unit and a memory, the computer program product, after being loaded, providing said processing unit with the capability to carry out the following task determining resulting cardiac contours for each image within the first image set and for each image within the second image set from the first cardiac contours and the second cardiac contours.

According to an embodiment of the system according to the invention, the first image set of a heart and the second image set of a heart relate to different levels of cardiac stress. The term "stress level" is meant to be synonymous with "levels of cardiac stress" and is meant to include rest, so that the term "two different stress levels" could be "rest" and "a stress level different from rest". Alternatively, the term "two different stress levels" could be "a first stress level different from rest" and "a second stress level different from rest and different from the first stress level". When the first image set of a heart and the second image set of a heart relate to different levels of cardiac stress, the method provides for a way to propagate contours from images at one stress level of a heart to images at another stress level of the heart, which is advantageous in that the individual images are obviously related. The method thereby provides for an improved segmentation of cardiac image sets obtained at different stress levels.

According to another embodiment of the system according to the invention, the first image set is further segmented resulting into further respective first cardiac contours; and the second image set is further segmented resulting into further respective second cardiac contours; the determining means of the system are arranged for determining the resulting cardiac contours for each image within the first image set and for each image within the second image set from the first cardiac contours, the second cardiac contours, the further first cardiac contours and the further second cardiac contours.

According to yet another embodiment of the system according to the invention, the system moreover comprises input means for letting a user manually specify the further respective first cardiac contour and/or the further respective second cardiac contour.

The same advantages are achieved as described with reference to the method according to the invention when applicable. It should be noted that the various configurations of a heart in its cycle of dilation and contraction are referred to as phases. Moreover, images of the heart obtained as different cross sections thereof are referred to as slices. The term "segmentation" is meant to denote the process of partitioning a digital image into multiple regions (sets of pixels). Image segmentation may be used to locate objects and boundaries (lines, curves, etc.) in images. The result of image segmentation is a set of regions that collectively cover the entire image, or a set of contour extracted from the image. The pixels in a region are similar with respect to some characteristic or computed property, such as color, intensity, or texture. Adjacent regions are significantly different with respect to the same characteristic(s). Finally, the term "propagate a cardiac contour" is meant to denote "copy and reshape a cardiac contour", e.g. from one phase to another phase, from one slice to another, from one stress level to another or a combination thereof.

BRIEF DESCRIPTION OF THE DRAWINGS

The above and other aspects of the invention will be apparent from and elucidated with reference to the embodiments described hereinafter as illustrated by the following Figures. The figures show one way of implementing the present invention and is not to be construed as being limiting to other possible embodiments falling within the scope of the attached claim set.

DETAILED DESCRIPTION OF EMBODIMENTS

Figure 1:
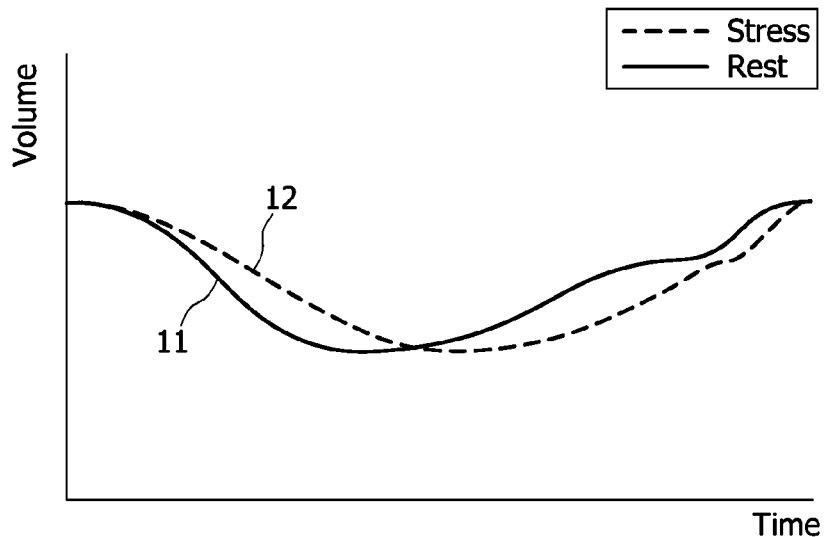
FIG. 1 illustrates a volume-time curve at rest and at stress.

FIG. 1 is a diagram illustrating a volume-time curve 11 at rest and a volume-time curve 12 at stress of a heart. The horizontal axis of the diagram illustrates the time whilst the vertical axis illustrates the left ventricular blood volume. The solid line 11 diagrammatically represents the left ventricular blood volume at rest and the dashed curve 12 represents the left ventricular blood volume at a stress level different from rest. The duration of a heart cycle of a person at rest will be longer than the duration of a heart cycle of the person at a stress level different from rest due to a lower heart rate at rest compared to the heart rate at stress levels. However, the two curves 11, 12 of FIG. 1 have been adjusted so that the lengths thereof are the same for ease of comparison. From FIG. 1 it can be seen that the relative length of the characteristic periods in the heart cycle known as ventricular systole, diastole and atrial systole, are different at rest and at a stress level different from rest, which causes temporal misalignment of the curves. During ventricular systole, the ventricles contract, such that the ventricular volume decreases. Ventricular systole is followed by diastole, in which the ventricles relax such that their volume increases again. Diastole is then followed by atrial systole in which the atria pump blood into the ventricles causing a further increase of ventricular volume.

The current invention exploits the relation between the images and contours from the acquired images using an optimal contour propagation, i.e. taking due regard of contours in other images at establishing the contour(s) of an image. Existing semi-automatic segmentation tools provide a means to propagate, i.e. to copy and reshape, cardiac contours from phase to phase. Similarly, one can propagate contours from one stress level directly to another. However, the result of that propagation will be sub-optimal for two reasons.

Firstly, the relative length of characteristic periods in the heart cycle at different stress levels are different from the corresponding characteristic periods in the heart cycle at rest as illustrated in FIG. 1, which effectively causes temporal misalignment. Secondly, direct propagation from one stress level to another ignores the relation between the phases of the target stress level.

The current invention deals with these problems by analyzing the plurality of resulting contours from different propagation paths, i.e. by determining a resulting contour for an image in one image set on the basis of segmentations of the image itself and images in two or more image sets and by indicating the relative importance or weight of the segmentations of the image itself and the images in the two or more image sets.

Figure 2:
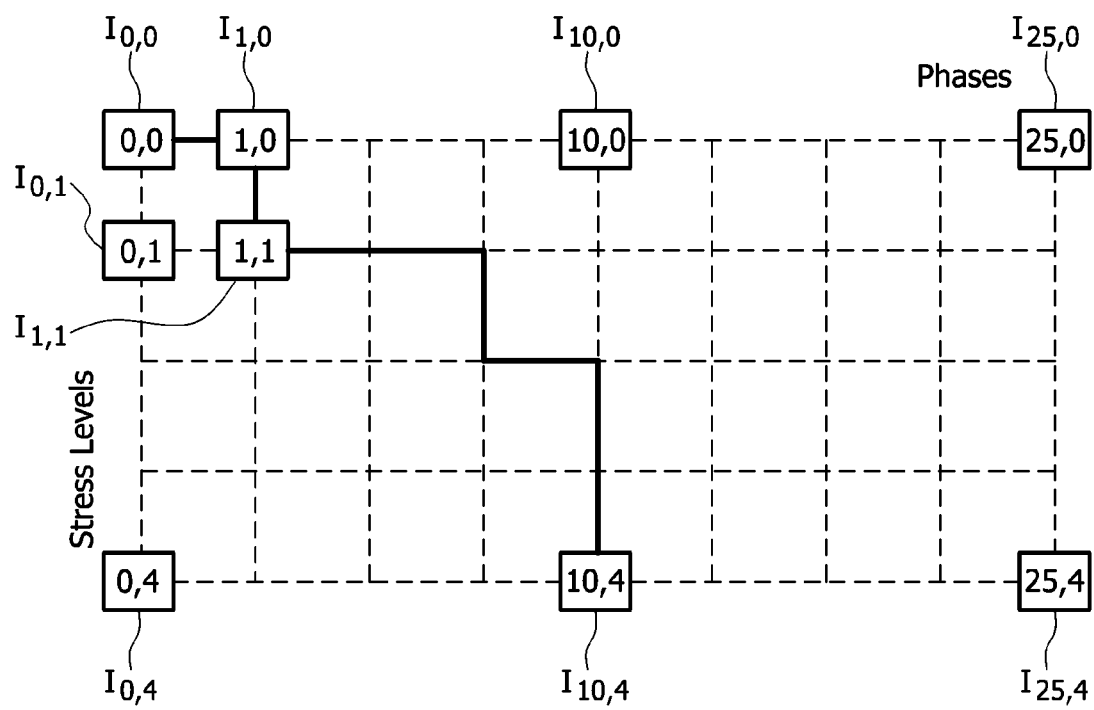
FIG. 2 illustrates a phase-stress matrix of images acquired in a functional stress exam.

FIG. 2 illustrates a phase-stress matrix of images acquired in a functional stress exam. FIG. 2 is a pictorial representation of a collection of images taken at 25 phases and five different stress levels. The images may be obtained by any appropriate modality, such as magnetic resonance (MR), computed tomography (CT), and ultrasound (US). The functional cardiac images consist of multiple phases and multiple slices; however in FIG. 2 the images relating to different slices are not shown. Thus, the set of images shown in FIG. 2 may relate to any slice through a heart and may advantageously be supplemented by a plurality of other sets of images of other slices through the heart. In FIG. 2 a grid of broken lines are shown. Each intersection between a horizontal and a vertical broken line corresponds to an image. However, only some of the images are shown in FIG. 2 for simplicity. Also for ease of simplicity only nine of the 25 phases are indicated in FIG. 2. It should be noted that other numbers or phases than 25 could be relevant and this number should not be taken as limiting the invention. It should be noted that the images in the phase-stress matrix of FIG. 2 may be seen as five image sets of a heart in different phases, wherein the five image sets corresponds to different stress levels of the heart. Alternatively, an image set of a heart may relate to a phase-slice matrix of images taken at different slice position and phase position in a beating cycle of a heart, and another image set could relate to a corresponding phase-slice matrix of images taken at another stress level.

Existing contour propagation tools provide a means of propagating from image $I_{0,0}$ to image $I_{1,0}$. Correspondingly, one may propagate contours along the stress direction from image $I_{0,0}$ to image $I_{0,1}$. For any image in the phase-stress matrix, a plurality of cardiac contours may be obtained by concatenating propagations in different orders. For example, to obtain cardiac contours for the image $I_{10,4}$ given the cardiac contours for the image $I_{0,0}$, the number of orders in which propagations can be concatenated is 1001, which is computed using the binomial coefficient $_{14}C_{10}$.

According to the invention, each of the images in the phase-stress matrix of FIG. 2 is segmented into respective cardiac contours. The invention relates to optimizing this initial segmentation by using knowledge of the segmentation of some of or all the other images in order to obtain optimal cardiac contours. Various methods can be used to obtain optimal cardiac contours from such a plurality of initial cardiac contours. One of the methods according to the current invention uses weighted averaging of contours. The relation between images determines the weights for imaging. Closely related images obtain higher weights then others. Consequently, neighboring phases and the images most alike in neighboring stress levels influence the segmentation result most.

Furthermore, the method of the invention can be deployed within a workflow-guided application such that manual contour correction are captured and propagated. The skilled user is given the opportunity to correct and/or confirm cardiac contours at images at any phase at a stress level. These corrections and/or these confirmed contours will then be propagated to the next stress level, where the user again has the opportunity to correct and/or confirm cardiac contours. In this way, the information provided by the corrections and/or confirmations of the user is captured and propagated. The corrected and/or confirmed contours are also denoted further respective cardiac contours.

Corrections and/or confirmations at one stress level are propagated to the others, such that similar imperfections need to be corrected only once. As consequence, the entire analysis can be performed more efficiently, with a significant reduction of the total segmentation time.

The method according to the invention controls contour propagations. A contour propagation can be defined as any algorithm capable of positioning contours in one image according its position in another. Contour propagation can be implemented using various techniques, all to be controlled using the current invention. Known contour propagation algorithms make use of explicit active contours (a.k.a. snakes), implicit active contours (a.k.a. level sets), graph cuts, dynamic programming approaches, image registration or a combination of the previously mentioned approaches. In similar fashion, the current invention can control surface propagations which can be implemented as the 3D extensions of the mentioned approaches.

The current invention obtains an optimal contour propagation result from the plurality of propagation results for an image in the phase-stress matrix can also be implemented in various ways.

First weighted averaging may be used to obtain a single segmentation from the plurality of segmentation results. For such implementations, one can assign weights in various ways. One may use fixed weights for propagation in stress and propagation in phase direction. Furthermore, weights may be set according the distance covered in the phase-stress matrix. A slightly more sophisticated approach would use optimal weights for all propagations defined in a look up table, obtained in a training stage. The implementation can also be more patient specific by determining the weights adaptively, for instance by setting the weights according the quality of the contour propagations.

As an alternative to the use of weighted averaging of the plurality of contours provided by different propagations, one may use selection techniques to obtain a single most optimal segmentation. One may compute minimal cost paths through the phase-stress matrix. These paths may be based on the distance traveled through the matrix, or again by the quality of contour propagation. These minimal cost paths can be computed per patient, but may also be determined a priori in a training stage.

Finally, one may make use of information derived from the segmentations to obtain even more accurate results in an iterative approach. For instance, one can use volume-time curves (see FIG. 1) derived from the segmentation to improve the temporal match between the individual stress levels, which can help to improve the segmentation etc.

The resulting or the optimal cardiac contours obtained from the initial cardiac contours in each of the images in each image set are determined by use of a number of the initial cardiac contours. As described above a number of ways of weighting the influence of the different initial cardiac contours exists. It should be noted that this weighting may involve all of the cardiac contours in all the images in the sets of images, or that only some of the images may be used for determining resulting cardiac contours for an image within an image set. Moreover, a corrected contour, an example of a further segmentation, may be given extra weight in that it may be trusted more than automatically obtained segmentations.

Figure 3:
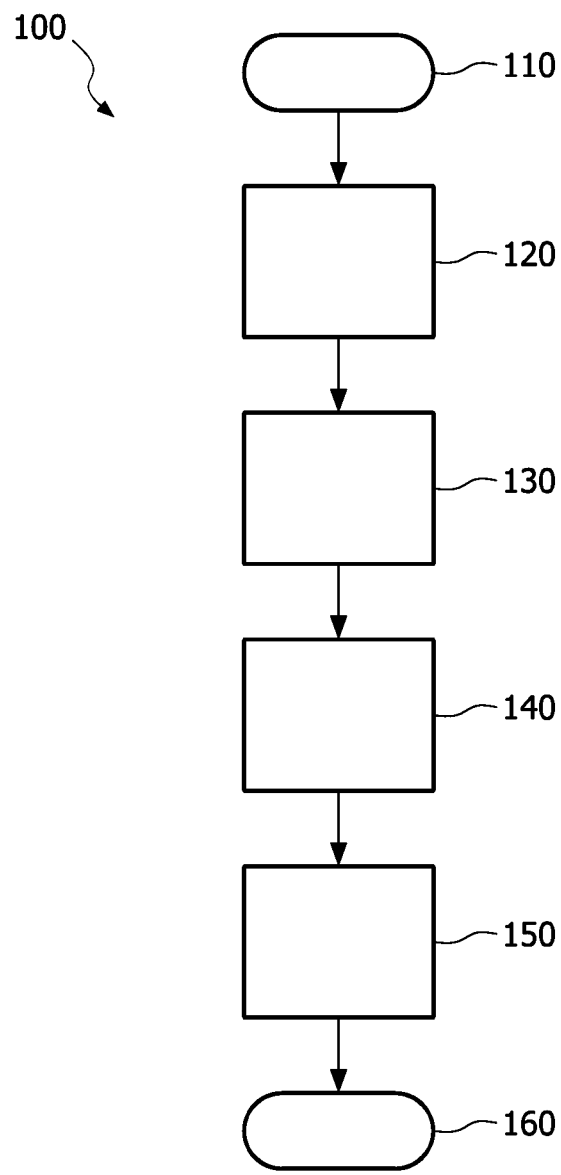
FIG. 3 is a flow diagram of a method of the invention.

FIG. 3 is a flow diagram of a method 100 according to the invention. The method is arranged for analyzing a multidimensional cardiac image set, the cardiac image set comprising a first image set of a heart and a second image set of a heart, preferably of the same heart. The method 100 starts at step 110 and continues to step 120 wherein the first image set of the heart is segmented into respective first cardiac contours for each image within the first image set. In step 130, the second image set of the heart is segmented into respective second cardiac contours for each image within the second image set. It should be noted that even though step 130 is shown as subsequent to step 120, step 120 could succeed step 130, or step 120 and step 130 could be performed simultaneously.

In an optional step 140, the first image set is further segmented resulting into further respective first cardiac contours and the second image set is further segmented resulting into further respective second cardiac contours. This further segmentation may be obtained as a correction to the segmentation in one or more of the images in the first image set and/or in the second image set; the correction may be made interactively by a user. Moreover, the further segmented contours may comprise contours confirmed by a user without corrections. When a user manually confirms or corrects contours, such confirmed or corrected contours may be given a high degree of trust.

On the basis of the segmentations obtained in step 120, 130 and optionally the further segmentation or correction obtained in step 140, the method proceeds to step 150 wherein resulting or optimal cardiac contours for each image within the first image set and for each image within the second image set is obtained from the first cardiac contours, the second cardiac contours, the further respective first cardiac contours and the further respective second cardiac contours. As described above, the resulting or optimal cardiac contour for each image may be obtained by use of appropriate weights for the other images in the same image set and for the images in the other image set. Some of the weights may be zero, so that not all images are taken into account for obtaining the optimal contours of an image. Alternatively, all images in both image sets are used for obtaining the optimal contours of an image. The method ends in step 160.

The current invention can for example be applied to dobutamine stress magnetic resonance (DSMR), short-axis (SA) cine Cardiac MR (CMR) scans are made at different levels of pharmacologically induced stress. Comprehensive analysis of these scans is currently done visually, but would preferably consist of quantification of ventricular function and wall motion at all stress levels, which requires delineation of the myocardium in all acquired images. First the cardiac contours for all stress scans given the cardiac contours at rest. The cardiac contours at rest can be obtained fast and accurately using the contour propagation algorithm described and validated in G. L. T. F. Hautvast et al., "Automatic Contour Propagation in Cine Cardiac Magnetic Resonance Images", IEEE TMI 25(11):1472-1482, 2006 such that only ED slices at rest need to be delineated manually. The current invention may be using the following three steps. First, affine registration between the images from the different stress levels is performed by using J. V. Hajnal et al., "Medical Image Registration", CRC Press, 2001. Next, contours are propagated from one stress level to another using active contours of G. L. T. F. Hautvast et al., "Automatic Contour Propagation in Cine Cardiac Magnetic Resonance Images", IEEE TMI 25(11):1472-1482, 2006. Then the resulting end diastolic cardiac contours are propagated from phase to phase. The result of this propagation over time is averaged with the result from propagation over the stress levels using the Repeated Averaging Algorithm (RAA) of V. Chalana et al., "A Methodology for Evaluation of Boundary Detection Algorithms on Medical Images", IEEE TMI 16(5):642-652, 1997 to obtain coherent cardiac contours over time.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A method for analyzing a multidimensional cardiac image set generated by an imaging scanner, the multidimensional cardiac image set comprising:
   a first image set of a heart generated by the imaging scanner; and
   a second image set of a heart generated by the imaging scanner, wherein the first and second image sets are different image sets, the method comprising:
   segmenting the first image set resulting in respective first cardiac contours for each image within the first image set;
   segmenting the second image set resulting in respective second cardiac contours for each image within the second image set and;
   determining, by a processor, resulting cardiac contours for each image within the first image set and for each image within the second image set from the first cardiac contours and the second cardiac contours.

2. The method according to claim 1, wherein said first image set of a heart and said second image set of a heart relate to different levels of cardiac stress.

3. The method according to claim 1, wherein
   the first image set is further segmented resulting into further respective first cardiac contours; and
   the second image set is further segmented resulting into further respective second cardiac contours, the method comprising:
   determining the resulting cardiac contours for each image within the first image set and for each image within the second image set from the first cardiac contours, the second cardiac contours, the further first cardiac contours and the further second cardiac contours.

4. The method according to claim 3, wherein the further respective first cardiac contour and/or the further respective second cardiac contour is/are specified manually.

5. The method according to claim 1, further comprising determining the resulting cardiac contours by using fixed weights for the first, second, further first, and further second cardiac contours.

6. The method according to claim 1, further comprising determining the resulting cardiac contours by using variable weights depending upon a position of an image within the first and second image set for the first, second, further first, and further second cardiac contours.

7. The method according to claim 1, further comprising determining the resulting cardiac contours by using predefined weights for the first, second, further first, and further second cardiac contours.

8. The method according to claim 1, further comprising determining the resulting cardiac contours by using adaptive weights depending upon the heart for the first, second, further first, and further second cardiac contours.

9. The method according to claim 1, further comprising determining the resulting cardiac contours by using a distance between a first image within the first image set and a second image within the second image set.

10. The method according to claim 1, further comprising determining the resulting cardiac contours by using temporal information from the segmentation and the further segmentation.

11. The method according to claim 1, wherein a contribution of the first cardiac contours to the resulting contours and a contribution of the second cardiac contours to the resulting contours are determined based on weights.

12. The method according to claim 1, wherein the first and second cardiac contours correspond to different propagation paths, and further comprising:
  determining a resulting contour for an image in one image set based on segmentations of the one image and images in first and second image sets by indicating a weight of the segmentations of the one image and the images in the first and second image sets.

13. A system for analyzing a multidimensional cardiac image set generated by an imaging scanner, the multidimensional cardiac image set comprising:
  a first image set of a heart generated by the imaging scanner; and
  a second image set of a heart generated by the imaging scanner, wherein the first and second image sets are different image sets, the first image set is segmented resulting into respective first cardiac contours for each image within the first image set; and
  the second image set is segmented resulting into respective second cardiac contours for each image within the second image set, the system comprising:
  a processor configured to compute resulting cardiac contours for each image within the first image set and for each image within the second image set from the first cardiac contours and the second cardiac contours.

14. The system according to claim 13, wherein said first image set of a heart and said second image set of a heart relate to different levels of cardiac stress.

15. The system according to claim 13, wherein the first image set is further segmented resulting into further respective first cardiac contours; and
the second image set is further segmented resulting into further respective second cardiac contours, wherein the processor is further configured to compute the resulting cardiac contours for each image within the first image set and for each image within the second image set from the first cardiac contours, the second cardiac contours, the further first cardiac contours and the further second cardiac contours.

16. The system according to claim 15, wherein the system moreover comprises an input device for letting a user manually specify the further respective first cardiac contour and/or the further respective second cardiac contour.

17. A non-transitory computer readable medium encoded with a computer program product to be loaded by a computer arrangement, comprising instructions for analyzing a multidimensional cardiac image set generated by an imaging scanner, the multidimensional cardiac image set comprising:
  a first image set of a heart generated by the imaging scanner, wherein the imaging scanner is at least one of a magnetic resonance (MR), a computed tomography (CT), or an ultrasound (US) imaging scanner, and
  a second image set of a heart generated by the imaging scanner, wherein the first and second image sets are different image sets, the first image set is segmented resulting into respective first cardiac contours for each image within the first image set; and the second image set is segmented resulting into respective second cardiac contours for each image within the second image set, the computer arrangement comprising:
  processing unit and a memory, the computer program product, after being loaded, providing said processing unit with the capability to carry out the following task determining resulting cardiac contours for each image within the first image set and for each image within the second image set from the first cardiac contours and the second cardiac contours.

18. The non-transitory computer readable medium according to claim 17, further providing said processing unit with the capability to carry out determining the resulting cardiac contours by using a distance between a first image within the first image set and a second image within the second image set.

19. The non-transitory computer readable medium according to claim 17, further providing said processing unit with the capability to carry out determining the resulting cardiac contours by using temporal information from the segmentation and the further segmentation.

* * * * *